United States Patent
Welch

(10) Patent No.: US 6,461,015 B1
(45) Date of Patent: Oct. 8, 2002

(54) PORTABLE WEARABLE STROBE LIGHT

(76) Inventor: Charles D. Welch, 38 Pembroke St., Kingston, MA (US) 02364

( * ) Notice: Subject to any disclaimer, the term of this patent is extended or adjusted under 35 U.S.C. 154(b) by 0 days.

(21) Appl. No.: 09/528,831

(22) Filed: Mar. 20, 2000

Related U.S. Application Data

(60) Provisional application No. 60/126,022, filed on Mar. 25, 1999.

(51) Int. Cl.$^7$ ............................................... F21V 21/08
(52) U.S. Cl. ........................ 362/103; 362/106; 362/108; 362/187; 362/296; 362/280; 362/323
(58) Field of Search ................................. 362/103, 105, 362/106, 108, 186, 187, 296, 216, 280, 282, 322, 323

(56) References Cited

U.S. PATENT DOCUMENTS

| | | | | |
|---|---|---|---|---|
| RE24,631 E | * | 4/1959 | Campanell | 340/321 |
| 3,963,917 A | * | 6/1976 | Romano | 362/35 |
| 4,328,533 A | * | 5/1982 | Paredes | 362/108 |
| 4,375,634 A | * | 3/1983 | Leis | 340/472 |
| 4,875,145 A | * | 10/1989 | Roberts | 362/103 |
| 5,128,844 A | * | 7/1992 | Landais | 362/105 |
| 5,452,189 A | * | 9/1995 | Alkjaer | 362/253 |
| 5,488,361 A | * | 1/1996 | Perry | 340/984 |
| 5,559,680 A | | 9/1996 | Tabanera | 362/106 |
| 5,688,039 A | | 11/1997 | Johnson | 362/106 |
| 5,690,411 A | | 11/1997 | Jackman | 362/103 |
| 6,015,217 A | * | 1/2000 | Colangelo | 362/103 |
| 6,106,130 A | * | 8/2000 | Harding | 362/108 |
| 6,244,235 B1 | * | 5/2001 | Parker | 362/190 |

* cited by examiner

*Primary Examiner*—Sandra O'Shea
*Assistant Examiner*—Ronald E. DelGizzi
(74) *Attorney, Agent, or Firm*—Cesari and McKenna, LLP; Edwin H. Paul

(57) ABSTRACT

A flashing light source mounted to rotate or fixed to the top of a hat or helmet. The light provided shines out throughout a full 360 degree circle around the wearer to signal and warn people of the presence of the wearer or of danger. In a preferred embodiment the lamp may be a single lamp formed as a circular xenon flash lamp or a bulb or flash tube with a reflector that rotates to traverse the entire 360 degree circle around the wearer.

12 Claims, 4 Drawing Sheets

PORTABLE WEARABLE STROBE LIGHT

RELATED APPLICATIONS

Priority is claimed under U.S.C. #119(e) for the present invention from a provisional patent application, entitled "Portable Wearable Strobe Light," serial No. 60/126,022, filed Mar. 25, 1999. This provisional application is hereby incorporated herein by reference.

FIELD OF THE INVENTION

The present invention relates to safety and warning indicators, and more particularly to portable, removable, and wearable active indicators, and even more particularly to wearable strobe light indicators.

BACKGROUND OF THE INVENTION

Policemen, firemen, public works employees, or anyone working in areas where there may be danger to themselves or to others have often sought to bring attention to themselves or to the locale so as to avert any danger. Police typically wear phosphorescent yellow indicators, Firemen wear red protective suits, FBI personnel wear coats with the letters FBI prominently printed on the backs and fronts, and street workers and bicyclers often wear brightly colored belts and/or ornaments.

U.S. Pat. No. 5,688,039 to Johnson discloses a pivoting projection beam safety helmet directed towards bicyclers. This patent provides a wide angle flashing rear light to warn approaching cars and a narrow forward lamp that illuminated the path ahead. U.S. Pat. No. 5,559,680 to Tabanera discloses an electroluminescent bicycle helmet with illuminated windows on the sides and front; and U.S. Pat. No. 5,690,411 discloses a signalling vest that indicates turning, forward, backward and stopped condition of the wearer.

There are many patents that disclose a wide variety of safety signaling light emitting diodes, flashlight-type lamp and phosphorescent, reflective and luminescent patches, belts, etc. However, each of these known devices has limitations that the present invention addresses. None of the known patents position a lamp so that the lamp shines in an entire 360 degree circumference around the wearer.

It is an object of the present invention to provide a wearable light source that provides light output in a complete 360 degree circle around the wearer.

It is another object of the present invention to provide a flashing light to attract attention, and it is a related object to use a flash lamp that outputs a bright light to enhance the attraction of attention.

Still another object of the present invention is to provide a wearable flashing lamp beam and means to rotate that beam completely around the wearer in a manner similar to a navigation lighthouse.

It is another object of the present invention to provide multiple wearable flashing light sources.

SUMMARY OF THE INVENTION

The foregoing objects are met by an active signalling device that is attached to a wearer. The active signalling device is a lamp which connected to and powered from an electronics assembly and a battery. The lamp is positioned so that it is viewable for a full 360 degrees around said housing.

In a preferred embodiment the signalling device is positioned on the top of a hat or cap. The lamp itself may be an incandescent or xenon flash lamp that is visible from any position around the wearer. One type of lamp is a circular flash tube, and another is a straight tubular style that may be arranged in a vertical direction for full 360 degree viewing. Other preferred embodiments include typical bulb styles that are mounted upright where they also are viewable over the full 360 degrees.

In another preferred embodiment the lamp shines outward from the wearer is a particular direction, but there is a motor rotating the lamp such that the shining traverses the entire 360 degrees around the wearer.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1A:
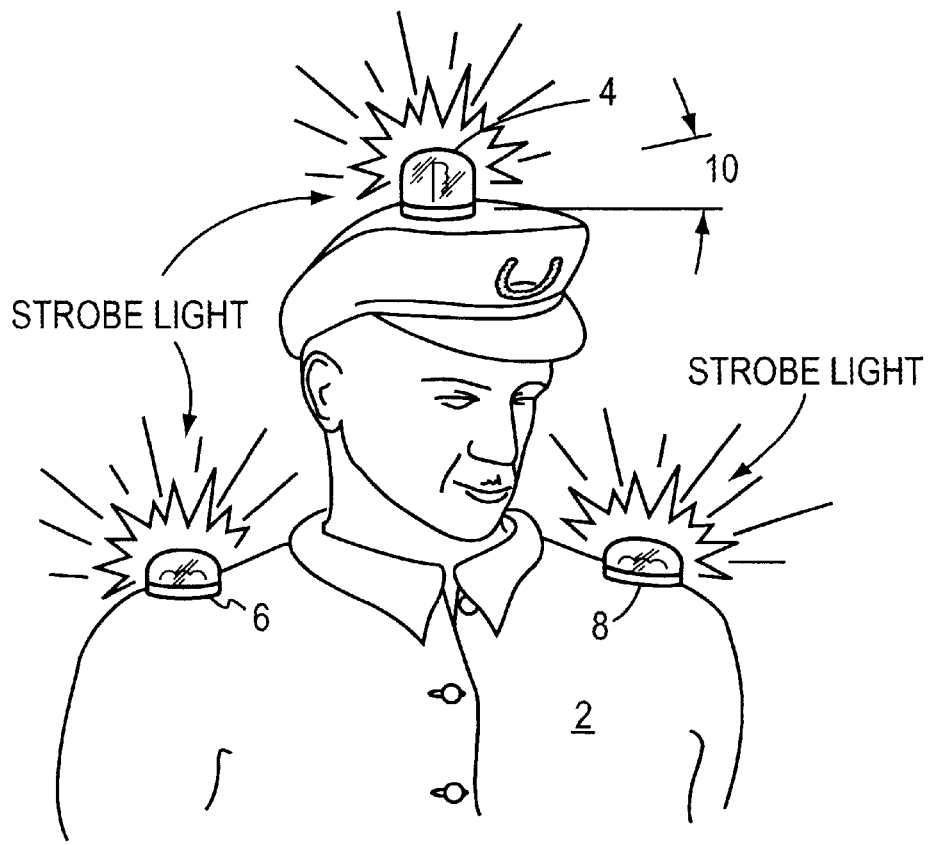
FIG. 1A is a pictorial view of a preferred embodiment of the present invention.

FIG. 1A shows a policeman or fireman 2 with a strobe flash lamp 4 attached to the top of his hat. A separate strobe flash lamp, 6 and 8, is attached to the top of each shoulder. In the case of the lamp 4, the light shines completely around the fireman 2—in a complete 360 arc or circle. Each lamp 6 and 8 also substantially shines in the complete 360 degree circle with the exception of the occluded part due to the head of the wearer. Notice that the occluded angle for lamp 6 is completely covered by lamp 8 and visa versa.

Figure 1B:
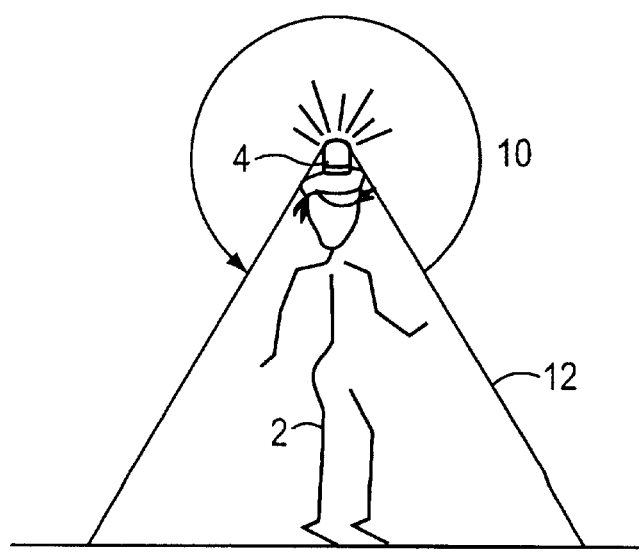
FIG. 1B shows the solid angle of a lamp shown in FIG. 1A.

FIG. 1B shows a diagram of the solid angle of light from the lamp 4. The light shines everywhere except in the cone 10 defined by the wearer's hat and height from the ground. As is evident the light will be viewable by virtually everyone approaching the wearer.

The lamps 6 and 8 on each shoulder define a similar cone of light as the lamp 4 except for the portion occluded by the wearer himself. But, the combination of a lamp on each shoulder provides a shining light signal that covers more than that of the single lamp on the hat. The shoulder lamps are important since it is felt that it is more likely for a wearer to doff his hat rather than his jacket while still needing a safety signal.

Figure 2:
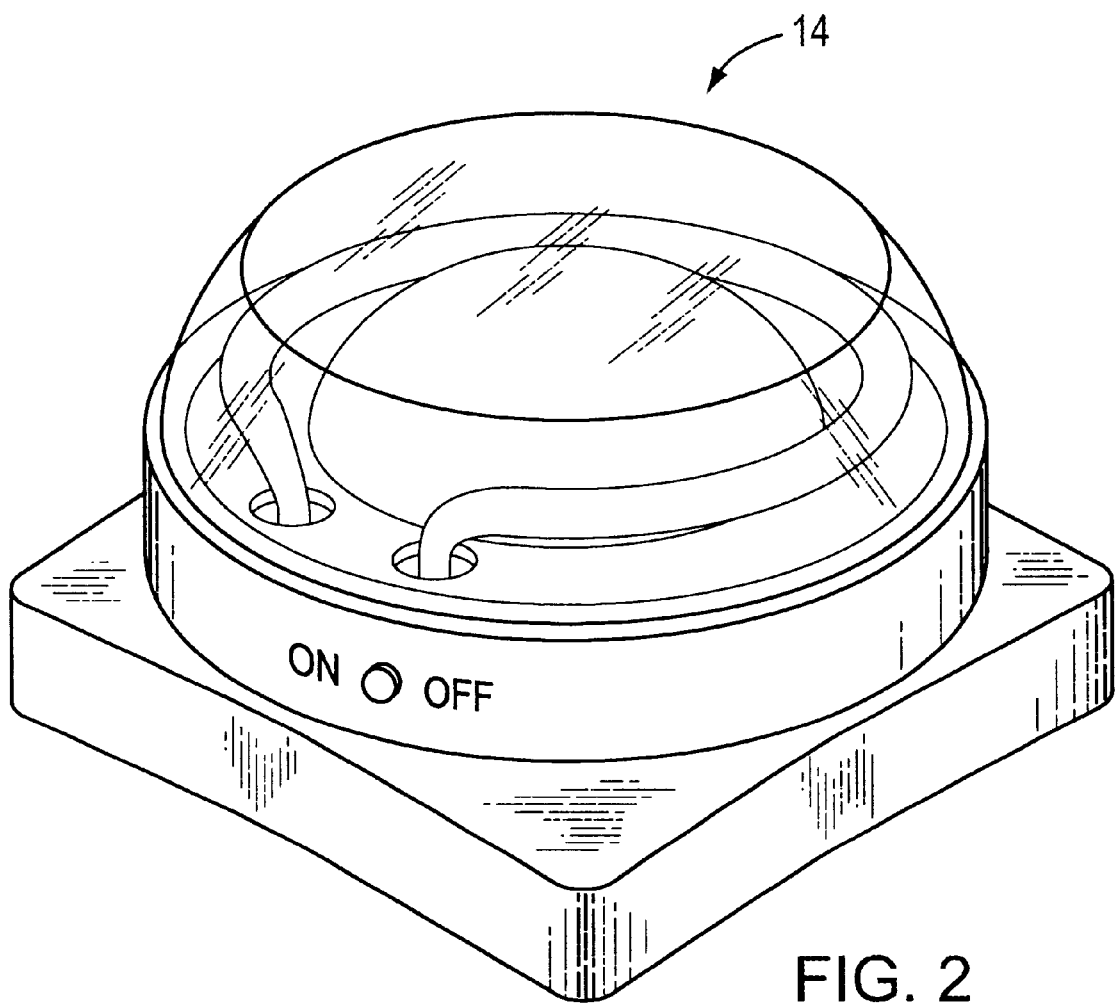
FIG. 2 is an isometric view of a preferred embodiment of a wearable strobe lamp assembly.
Figure 3:
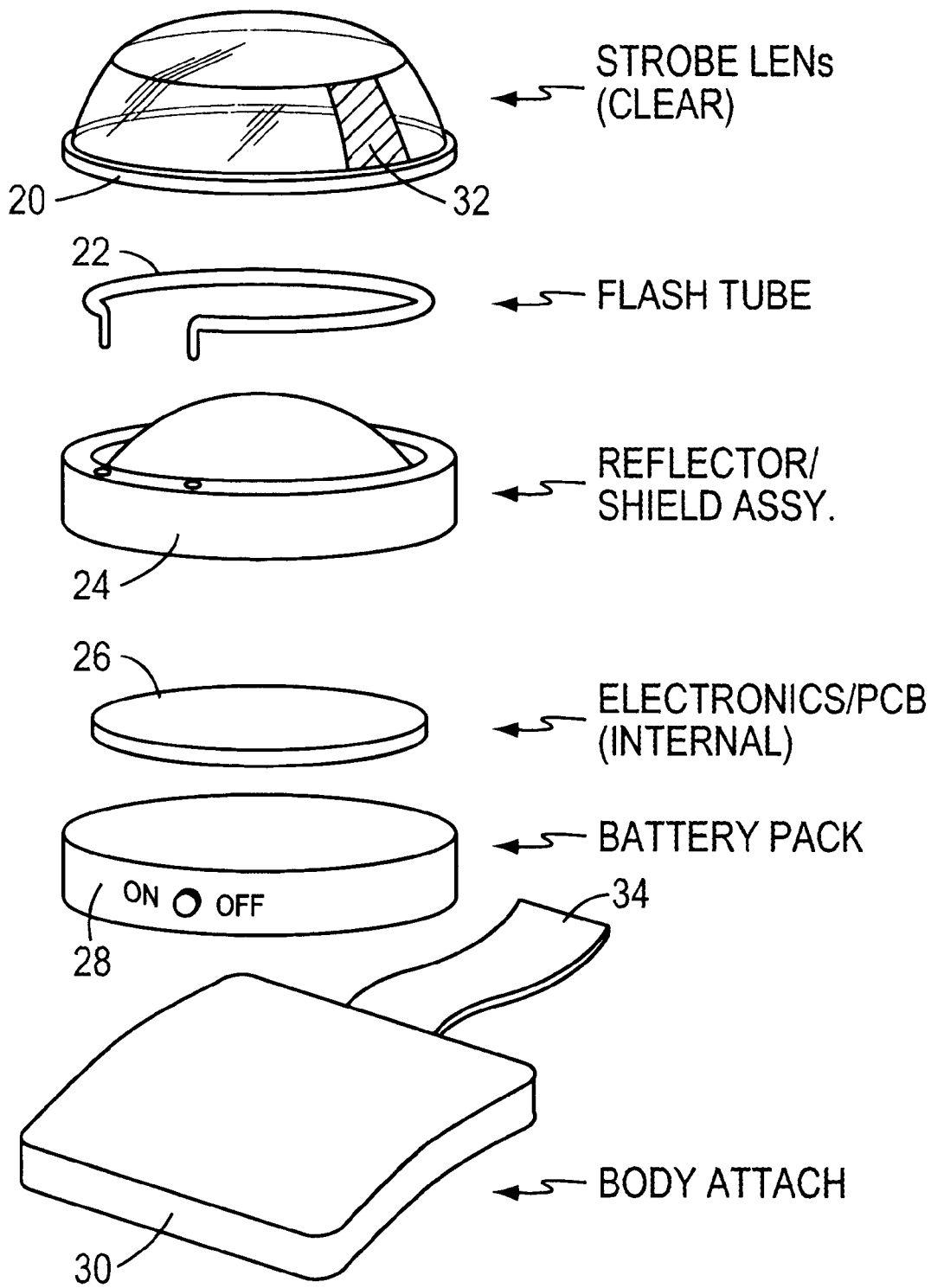
FIG. 3 is an exploded view of the parts that make up the assembly of FIG. 2.

FIG. 2 shows a preferred embodiment of a lamp assembly 14 suitable for use in the present invention. FIG. 3 is an exploded view of the elements of the lamp assembly 14 of FIG. 2. With respect to FIG. 3 a top lens or cover 20 fits over a curved xenon lamp tube 22. The tube rests on a reflective shield plate 24, and the lamp makes electrical connections through the plate 24 to an internal electronics printed circuit board (PCB) 26 which is attached to a battery pack 28. The battery pack and the electronics to fire the lamp are known in the art. There is a plate 30 used to attached the assembly to the hat or jacket shoulder of the wearer. Finally, there is a flap 34 extending from the plate to occlude the angle made by the wearer's head so that the flash does not shine into the wearer's face. The flap 34 can be of a material and attached to the bottom of the lamp assembly as is known in the art.

In the case of the shoulder lamp assemblies, a shielded portion 32 may be provided to prevent the lamp from shining into the wearer's eyes. A separate shield may be provided 34 attached to the base or to the wearer himself separated from the lamp assembly (not shown).

The means to attach the lamp assembly may be by VELCRO, sewing, magnetics, pins, a mechanical mount, and other ways that are well known in the art, including combinations of such methods.

The flash lamp is preferably a xenon flash lamp, but other such lamps can be used including incandescent lamps which may not be flashing.

Figure 4:
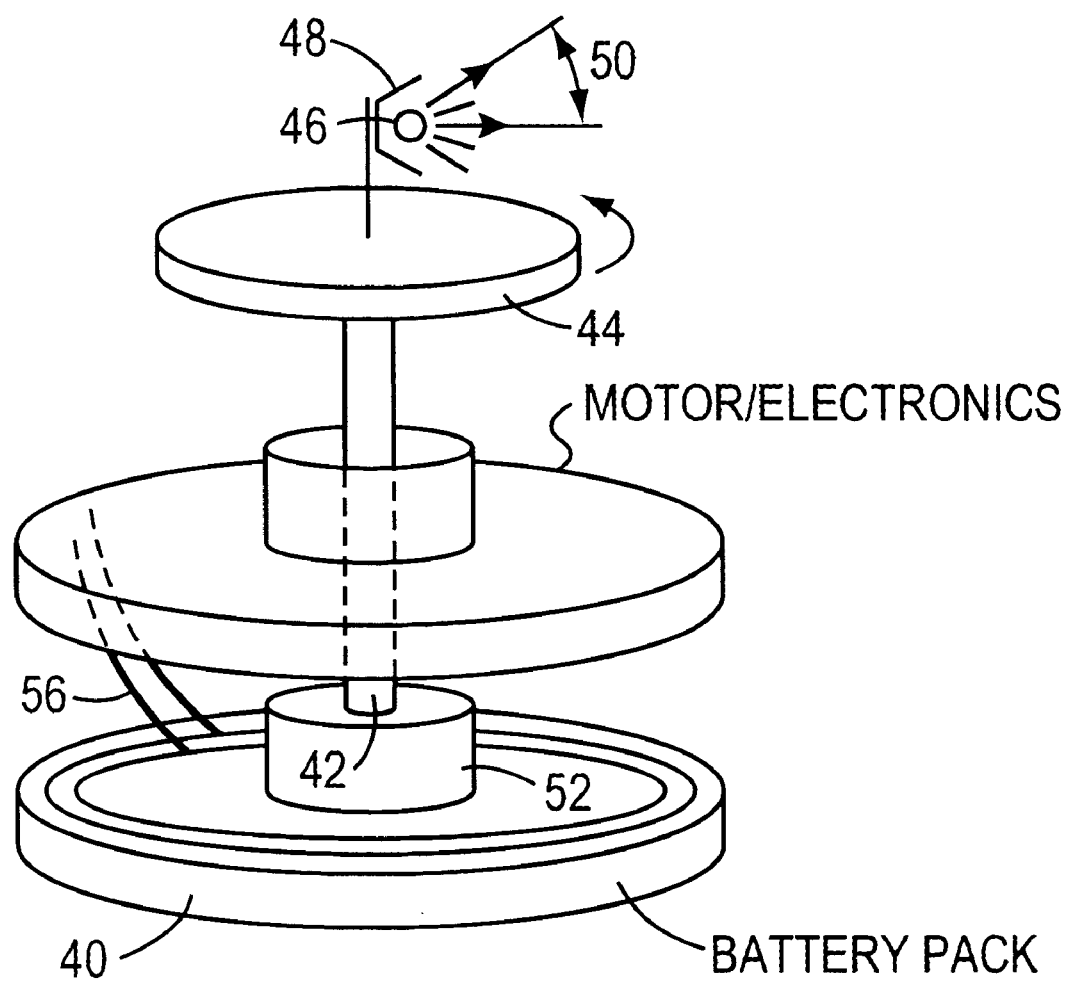
FIG. 4 is an exploded view of another embodiment of the invention.

In another preferred embodiment, shown in FIG. 4, the battery pack 40 has a center through shaft 42 attached to the upper portions of the lamp assembly. The shaft rotates 44 and carries a flash tube 46 that is enclosed in a reflector shield 48 that directs the light in a beam 50. The beam is arranged to flash out of synchronism and/or much faster than the period of rotation so that the effect is a rotating flashing light traversing a full 360 degrees around the wearer. In this instance there is a motor 52 with a bushing or bearing to support the shaft supporting the lamp itself. The electronics can also be rotating as shown thereby requiring brushes or sliding contacts 56 to bring power to the electronics. The electronics could also be assembled to not rotate (not shown) and the drive signals to the flash lamp would then be carried on the sliding contacts.

The wearable light source of the present invention can be attached to a car with a magnet or by other means known in the art to a fixed object to warn of a dangerous location. This preferred embodiment provides the inventive full 360 degree signalling capability of a single flashing light source.

The battery pack can be preferably a re-chargeable or a disposable battery as is known in the art.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. An active signaling device, for wearing on a person's clothing, comprising:

a housing, a battery positioned within said housing, an electronics assembly connected to the battery and positioned within said housing, a Xenon gas discharge flash lamp connected to and powered from said electronics assembly and said battery, wherein said lamp is positioned relative to said housing so that said lamp is viewable for substantially 360 degrees around said housing, and means for removably attaching said wearable, active signaling device to a person's clothing.

2. The device as defined in claim 1 wherein the active signaling device is removably worn on a hat or cap or on the shoulders of the person's clothing.

3. The device as defined in claim 1 further comprising one of more additional lamps connected to and powered by said electronics assembly, wherein said additional lamps are worn on the shoulders of the person's clothing or on the person's hat or cap.

4. The device as defined in claim 1 wherein the lamp is a strobe lamp.

5. The device as defined in claim 1 wherein a reflector is positioned to reflect the light from the flash lamp.

6. The device as defined in claim 5 wherein the reflector is rotatable substantially in a complete arc around the lamp.

7. An active signaling device, for wearing on a person's clothing, comprising:

a housing, an electronics assembly containing lamp drive circuitry located within said housing, a battery connected to the electronics assembly, said battery located with said housing, a Xenon gas discharge lamp mounted on the housing and electrically connected to the drive circuitry and powered from the battery, wherein said lamp is positioned relative to said housing so that said lamp is viewable for substantially 360 degrees around said housing, and means for removably attaching the active signaling device to a person's clothing.

8. The device as defined in claim 7 further comprising means for powering additional lamps from said housing wherein the additional lamps may be positioned on various parts of a person's clothing.

9. An active, portable signaling device comprising:

a housing, a battery mounted within said housing, an electronics assembly connected to the battery and positioned within said housing, a Xenon gas discharge flash lamp mounted on the housing and electrically connected to and powered from the battery, wherein said lamp is positioned relative to said housing so that said lamp is viewable for substantially 360 degrees around said housing, and means for removably attaching the active signaling device to an object.

10. The active, portable signaling device as defined in claim 9 wherein the means for attaching comprises a magnet.

11. The active, portable signaling device as defined in claim 9 wherein the object is a motor vehicle.

12. The active, portable signaling device as defined in claim 9 further comprising:

means for rotatably mounting the flash lamp on the housing and wherein the electrical connection to the drive circuitry and the battery comprises sliding electrical contacts.

* * * * *